(12) United States Patent
Li et al.

(10) Patent No.: US 11,213,788 B2
(45) Date of Patent: Jan. 4, 2022

(54) METHOD OF FLUE GAS DENITRIFICATION (71) Applicants: China Petroleum & Chemical Corporation, Beijing (CN); Fushun Research Institute of Petroleum and Petrochemicals, SINOPEC CORP., Fushun (CN)

(72) Inventors: Xin Li, Fushun (CN); Shuhe Liu, Fushun (CN); Tianzhu Han, Fushun (CN); Mingxing Wang, Fushun (CN)

(73) Assignees: China Petroleum & Chemical Corporation, Beijing (CN); Fushun Research Institute of Petroleum and Petrochemicals, SINOPEC CORP., Liaoning (CN)

(*) Notice: Subject to any disclaimer, the term of this patent is extended or adjusted under 35 U.S.C. 154(b) by 498 days.

(21) Appl. No.: 16/329,111

(22) PCT Filed: Aug. 31, 2017

(86) PCT No.: PCT/CN2017/099794
§ 371 (c)(1),
(2) Date: Feb. 27, 2019

(87) PCT Pub. No.: WO2018/041171
PCT Pub. Date: Mar. 8, 2018

(65) Prior Publication Data
US 2019/0224621 A1 Jul. 25, 2019

(30) Foreign Application Priority Data
Aug. 31, 2016 (CN) .......................... 201610767731.8

(51) Int. Cl.
*B01D 53/83* (2006.01)
*B01D 53/86* (2006.01)
(Continued)

(52) U.S. Cl.
CPC ............ *B01D 53/83* (2013.01); *B01D 53/56* (2013.01); *B01D 53/8631* (2013.01); *B01J 8/08* (2013.01);
(Continued)

(58) Field of Classification Search
CPC B01D 24/34; B01D 33/0166; B01D 46/0036; B01D 46/0038; B01D 46/0054;
(Continued)

(56) References Cited

U.S. PATENT DOCUMENTS 3,375,638 A * 4/1968 Dungler ................. B01D 46/18
96/39
5,232,477 A * 8/1993 Kurr ...................... B01D 46/18
55/290
(Continued)

FOREIGN PATENT DOCUMENTS

CN 2350119 Y * 11/1999 ................. B01J 8/28
CN 1911491 A * 2/2007 ............. B01D 53/83
(Continued)

*Primary Examiner* — Timothy C Vanoy
(74) *Attorney, Agent, or Firm* — Novick, Kim & Lee, PLLC; Allen Xue (57) ABSTRACT A method for flue gas denotation includes the step of, in the presence of ammonia, enabling flue gas in a denitration reactor to pass through a plurality of catalyst beds from the bottom to the top to participate in a denitration reaction. Each catalyst bed contains a catalyst support component and a granular denitration catalyst stacked on the catalyst support component, and, in every single catalyst bed, the granular denitration catalyst moves along a same direction on the catalyst support component. Between every two adjacent catalyst beds, the granular denitration catalyst falls from the tail of a previous catalyst support component to the
(Continued)

head of a next catalyst support component, making the granular denitration catalyst travel along the catalyst support components reciprocatively.

19 Claims, 1 Drawing Sheet

(51) Int. Cl.
*B01J 8/08* (2006.01)
*B01J 8/12* (2006.01)
*B01J 35/02* (2006.01)
*B01J 35/10* (2006.01)
*B01D 53/56* (2006.01)

(52) U.S. Cl.
CPC ............... *B01J 8/085* (2013.01); *B01J 8/12* (2013.01); *B01J 35/023* (2013.01); *B01J 35/1014* (2013.01); *B01J 35/1019* (2013.01); *B01D 2251/2062* (2013.01); *B01D 2257/302* (2013.01); *B01D 2257/404* (2013.01); *B01D 2258/0283* (2013.01)

(58) Field of Classification Search
CPC ........ B01D 46/22; B01D 46/18; B01D 46/53; B01D 46/06; B01D 53/565; B01D 53/83; B01D 53/8631; B01D 2257/402; B01D 2257/404; B01D 2258/0283; B01J 8/10; B01J 8/125; B01J 19/28; B01J 2208/00884; B01J 2219/3327
See application file for complete search history.

(56) References Cited

U.S. PATENT DOCUMENTS

| | | | | |
|---|---|---|---|---|
| 5,494,500 A | * | 2/1996 | Ikenaga | C05D 9/00 96/109 |
| 5,750,084 A | * | 5/1998 | Tsutsumi | B01D 53/565 423/239.1 |

FOREIGN PATENT DOCUMENTS

| | | | | |
|---|---|---|---|---|
| CN | 101613101 A | | 12/2009 | |
| CN | 105859097 A | * | 8/2016 | ............ C02F 11/12 |
| EP | 2 789 677 A1 | * | 10/2014 | ............ B01J 8/085 |
| JP | S51129871 A | | 11/1976 | |
| JP | S52148469 A | | 12/1977 | |
| JP | 54066380 A | * | 5/1979 | ............ B01D 53/68 |
| JP | 60122028 A | * | 6/1985 | ............ B01D 53/68 |
| JP | 09052015 A | * | 2/1997 | ............ B01D 53/44 |

\* cited by examiner

METHOD OF FLUE GAS DENITRIFICATION

FIELD OF THE INVENTION

The present invention relates to the technical field of flue gas denitrification, in particular to a method of flue gas denitrification.

BACKGROUND OF THE INVENTION

Nitrogen oxides, generally expressed as NOR, are one of major pollution sources for atmospheric pollution. Among nitrogen oxides, the most hazardous ones are mainly NO and $NO_2$. NOR mainly has the following hazards: (1) toxic effects on human body; (2) toxic effects on plants; (3) acid rain and acid mist may be formed; (4) photochemical smog may be formed through reaction with hydrocarbons; (5) damage to ozone sphere.

Flue gas denitrification refers to removing $NO_x$ from flue gas, which can be classified into wet denitrification and dry denitrification according to the treatment process. The processes mainly include: acid absorption process, alkali absorption process, selective catalytic reduction process, non-selective catalytic reduction process, adsorptive process, and ion activation process, etc. In addition, some researchers at home and abroad have developed a method for treating $NO_x$ exhaust gases with microbes. However, the selective catalytic reduction (SCR) method has industrial value and is widely applied.

At present, the denitrification treatment of FCC regenerated flue gas from coal-fired power plants and oil refineries mainly employs the SCR method associated with wet washing desulfurization and dust removal. In the example of FCC flue gas, the main process is as follows: firstly passing the FCC regenerated flue gas at 500-600° C. through a waste heat boiler to recover heat, and cooling the flue gas to 320-400° C.; then feeding the flue gas into a SCR fixed bed-type reactor to undergo denitrification reaction therein for removing $NO_x$ from the flue gas; next, returning the flue gas to the waste heat boiler for further heat recovery, and thus cooling the flue gas to 150-200° C.; then feeding the flue gas into a desulfurization and dust removal washing tower, in which $SO_x$ and dust in the flue gas are washed off with the alkaline absorption liquid, and then cooling the flue gas to 55-60° C. and emitting it. The waste desulfurization absorption liquid is subjected to settlement, filtering, and concentrating steps, etc., to accomplish liquid-solid separation; after the liquid-solid separation, the clear liquid is aerated in air for oxidation till reaching the COD standard, and then the clear liquid is discharged, while the solids are land-filled.

All of existing SCR denitrification processes use fixed bed denitrification reactors, and the catalysts in a form of honeycomb, plate form, or corrugated form, are disposed in a modular form in the reactors. The reducer $NH_3$ is injected firstly in front of the reaction beds, so that $NH_3$ is fully mixed with $NO_x$ in the flue gas, and the $NO_x$ is catalytically reduced into $N_2$ in the denitrification catalyst beds.

The Prior Art Involves the Following Problems:

(1) Owing to the fact that the flue gas usually contains $SO_2$, $SO_3$, $O_2$ and vapor, if the ammonia is excessive (ammonia escape), the ammonia in the reaction zone may react with $SO_3$ and thereby ammonium salt ($NH_4HSO_4$) may be generated; the generated ammonium salt is in liquid state at 180-240° C. and viscous, and may adhere to the heat exchange tubes of the coal economizer, a downstream device of the SCR denitrification reactor, and capture dust in the flue gas, causing scaling, clogging and corrosion of the heat exchange tube and thus shorten operation period of the apparatus. To avoid ammonia escaping, the uniformity requirement of ammonia injection at the inlet of the SCR fixed bed-type reactor is that the deviation usually must be within ±5% range.

(2) The $NO_x$ content in the flue gas is related to the processing conditions of the main apparatus, and may fluctuate within a wide range, while the quantity of the catalyst in the SCR fixed bed-type reactor is constant; as a result, once the $NO_x$ concentration in the flue gas exceeds the design value, the $NO_x$ content in the purified flue gas can't meet the standard. Consequently, the operating flexibility of the fixed bed is poor.

(3) During the operation of the fixed bed-type reactor, the activity of the catalyst declines gradually, and the catalyst has to be replaced once the concentration of $NO_x$ at the outlet of the reactor fails to meet the standard. Usually, the operation period of the SCR unit should be at least 3-4 years; otherwise the operation of the main apparatus may be affected. Usually, the denitrification efficiency of the SCR unit should be at least 60-90%, and at least about 60% catalyst activity remains when the catalyst is replaced. Apparently, the utilization efficiency of the catalyst is low when using fixed bed SCR reactor.

(4) Usually wet washing dust removal, following the flue gas denitrification, is preceded together with desulfurization, and the desulphurization waste liquid is subjected to liquid-solid separation after dust removal. Consequently, the processes are complex and long, and the operations are complex, and thus the investment and operation costs are high.

At present, the industrialized moving-bed SCR reactor has not been reported. CN102008893A discloses a conventional moving-bed reactor for SCR reaction, but the moving-bed reactor is not suitable for operating conditions of heavy loaded flue gas, flue gas containing dust, and flue gas in low residual pressure, since pressure drop is required when the flue gas passes through the beds. Moreover, since the flue gas moves downward by gravity, when the reactor is big, there is a problem of movement uniformity; the beds may be bridged and clogged, the granularity requirement for the catalyst is high, and reaction uniformity is also a consideration.

SUMMARY OF THE INVENTION

To overcome the drawbacks of the existing SCR process and equipment, including low utilization efficiency of the catalyst, poor operating flexibility, and additional wet washing dust removal after flue gas denitrification, the present invention provides a method of flue gas denitrification.

To attain the object described above, the present invention provides a method of flue gas denitrification, comprising: in the presence of ammonia, passing flue gas through a plurality of catalyst beds from bottom to top in a denitrification reactor to undergo a denitrification reaction, wherein each catalyst bed comprises a catalyst support component and a granular denitrification catalyst stacked on the catalyst support component; the two catalyst support components in every two adjacent catalyst beds, i.e. an upper catalyst support component and a lower one, travel in directions opposite to each other, and the granular denitrification catalyst on the upper catalyst support component moves with the upper catalyst support component to a tail end of the upper catalyst support component, and falls freely by gravity to a head end of the lower catalyst support component.

The present invention further provides a method of flue gas denitrification, comprising: feeding flue gas into a denitrification reactor from the bottom of the denitrification reactor, injecting a gas mixture containing ammonia into the flue gas through ammonia injection grilles, and passing the gas flow through a plurality of catalyst beds arranged in a horizontally staggered manner from bottom to top to undergo a denitrification reaction for removing $NO_X$, at the same time the dust in the flue gas is filtered off by the catalyst beds, and the denitrificated and dedusted flue gas is discharged from the top of the reactor for subsequent desulfurization treatment; wherein the catalyst bed consists of a net conveyor belt and a granular denitrification catalyst stacked on the net conveyor belt, the two conveyor belts in every two adjacent catalyst beds i.e. an upper conveyor belt and a lower one, travel in directions opposite to each other, the granular denitrification catalyst on the upper conveyor belt moves with the upper conveyor belt to a tail end of the upper conveyor belt, and falls freely by gravity to a head end in the travel direction of the lower conveyor belt. At a tail end of the last conveyor belt, the granular denitrification catalyst falls into a catalyst recycling device and is recycled.

Compared with the prior art, the method according to the present invention has the following advantages:

(1) The method according to the present invention has high flexibility and adaptability, the residence time of the denitrification catalyst in the reactor can be adjusted by adjusting the movement speed of the denitrification catalyst on the catalyst support components, the reaction time of the flue gas passing through the catalyst beds can be adjusted by adjusting the stacking thickness of the catalyst on the catalyst support components, and thereby flue gas containing $NO_X$ in a wider concentration range can be treated, and the utilization efficiency of the catalyst can be maximized.

(2) In the present invention, the catalyst can be reused repeatedly, and can be replaced at any time; therefore, the utilization efficiency of the catalyst is much higher than that of conventional fixed bed-type reactors, and the consumption of the catalyst is greatly reduced, and the catalyst can be replaced online, to ensure stable catalyst activity in the reactor.

(3) In the present invention, the catalyst granules are in counter-current contact with the flue gas in the reactor. The catalyst beds in the upper part of the reactor can absorb excessive ammonia, and during the downward movement of the catalyst, the catalyst granules consume the ammonia reacted with the flue gas, or absorb the ammonia in the catalyst granules and carry the absorbed ammonia away from the reactor, thereby avoiding ammonia escape. In the method according to the present application, the uniformity requirement of initial ammonia distribution in the beds is not stringent, moreover secondary pollution incurred by ammonia escape and bed clogging incurred by ammonium hydrogen sulfate are avoided, and thus the operation period of the apparatus is prolonged.

(4) In the present invention, the granular catalyst beds attain a filtering effect for the dust in the flue gas, and the process is simpler than the conventional one. Moreover, the residual dust in the catalyst beds can be taken away from the reaction system together with the catalyst to achieve a dust removing effect. Besides, compared with the catalysts in conventional fixed bed-type reactors, the large-diameter spherical granular catalyst has greater specific surface area when contacting with the flue gas, thus the denitrification efficiency is higher.

(5) Compared with conventional moving-bed reactors, the stacking thickness of the catalysts on the catalyst support components in the present invention is adjustable, and the apparatus in the present invention is adaptive to operating conditions of heavy loaded flue gas, flue gas containing dust, and flue gas in a low residual pressure. In addition, since the catalysts move along the catalyst support components in the reactor, catalyst retention in the reactor can be avoided, and thereby the clogging phenomenon can be avoided.

(7) Similar to the liquid phase in a plate-type tower, the denitrification catalyst moves from the top of the reactor to the lower beds successively, and thus an activity gradient is established in the vertical direction of the reactor which is beneficial for deep denitrification, and thereby the catalyst activity can be fully utilized, and the reaction is uniform.

| Brief Description of the Symbols | | | |
|---|---|---|---|
| 1 | flue gas | 2 | gas mixture containing ammonia |
| 3 | charged catalyst granules | 4 | catalyst granules after denitrification |
| 5 | purified gas | 6 | ammonia injection grilles |
| 7 | catalyst charging pipe | 8 | catalyst support component |
| 9 | conveyor belt driving wheel | 10 | catalyst discharging pipe |
| 11 | catalyst hopper | 12 | inner barrel of reactor |
| 13 | reactor shell | | |

DETAILED DESCRIPTION OF THE INVENTION

The end points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In the present invention, unless otherwise specified, the terms that denote the orientations are used as follows, for example: "top" and "bottom" usually refer to "top" and "bottom" as shown in the accompanying drawings; "inside" and "outside" refer to inside and outside in relation to the profiles of the components.

The method of flue gas denitrification according to the present invention comprises: in the presence of ammonia, passing flue gas through a plurality of catalyst beds in a denitrification reactor from bottom to top to undergo a denitrification reaction, wherein each catalyst bed comprises a catalyst support component and a granular denitrification catalyst stacked on the catalyst support component; the two catalyst support components in every two adjacent catalyst beds, i.e. an upper catalyst support component and a lower one, travel in directions opposite to each other, and the granular denitrification catalyst on the upper catalyst support component moves with the upper catalyst support component to a tail end of the upper catalyst support component, and falls freely by gravity to a head end of the lower catalyst support component.

In the denitrification reactor, the catalyst support components should have pores, to enable the flue gas to pass through the catalyst beds. Preferably, the catalyst support components are in a net form.

According to a preferred embodiment of the present invention, the catalyst support component is a net conveyor belt. In such a case, the granular denitrification catalyst on the net conveyor belt can be conveyed from one end to the other end, and the movement speed of the granular denitrification catalyst may be adjusted flexibly by controlling the conveying speed of the conveyor belt. Moreover, each catalyst bed is provided with a net conveyor belt separately, so that the movement speed and stacking thickness of the catalyst in each catalyst bed can be controlled independently, and thereby the mutual interference between the beds is reduced. Further preferably, a plurality of catalyst beds are arranged in parallel to each other from top to bottom, i.e., a plurality of net conveyor belts that serve as catalyst support components are arranged in parallel to each other, so that the granular denitrification catalyst is distributed evenly on each net conveyor belt, thereby to fully utilize the catalyst activity.

In the present invention, the net conveyor belts may be conventional metal net conveyor belts in the art, preferably stainless steel net conveyor belts. The mesh size of the net conveyor belts must be smaller than the granule size of the granular denitrification catalyst, to ensure that the catalyst granules will not fall through the nets. Usually, the mesh size of the net conveyor belts may be 0.1-3 mm, preferably 1.5-2.5 mm.

In the present invention, the number and width of the catalyst beds may be selected according to the actual requirement and the size of the reactor. The number of the catalyst beds preferably is 3-10, more preferably 3-8. In the width direction of the catalyst support components (preferably net conveyor belts), the gap between the catalyst support components and the reactor wall may be 2-50 mm, preferably 2-5 mm.

In the present invention, the vertical distance between every two adjacent catalyst beds may be 50-2,000 mm. Preferably, in a case that the catalyst support components are net conveyor belts and a plurality of catalyst support components are arranged in parallel to each other, the vertical distance between every two adjacent catalyst beds is 1,200-2,000 mm, preferably 1,400-1,600 mm.

In the present invention, in a case that the catalyst support components are net conveyor belts and a plurality of catalyst support components are arranged in parallel to each other, the stacking thickness of the granular denitrification catalyst on the net conveyor belts may be 50-500 mm, preferably 200-300 mm.

In the present invention, in a case that the catalyst support components are net conveyor belts, the conveying speed of the net conveyor belts may be 0.1-10 mm/s, preferably 0.5-2 mm/s.

In the method according to the present invention, the flue gas may be selected from flue gas from coal-fired power plants, or FCC regenerated flue gas, or flue gas from a process furnace in oil refineries or a chemical furnace (e.g., flue gas from ethylene cracking furnace), and usually contains $NO_x$, $SO_x$, and impurities. The impurities usually are dust, water, $CO_2$ and $O_2$, etc. The temperature of the flue gas entering the denitrification reactor may be 300-420° C., preferably 340-400° C.

In the method according to the present invention, the ammonia may be introduced in a conventional way in the art; for example, in the form of ammonia gas. Preferably, the ammonia is introduced in the form of a gas mixture that contains ammonia and air, and the volumetric concentration of the ammonia in the gas mixture may be 0.5-10%, preferably 3-7%.

In the method according to the present invention, the gas mixture containing ammonia and air preferably is injected below the catalyst beds, i.e., the gas mixture containing ammonia and air is injected below the bottommost catalyst bed. The gas mixture containing ammonia and air may be injected through ammonia injection grilles disposed at the flue gas inlet. The ammonia injection grilles may be conventional ammonia injection grilles in the art. However, in conventional SCR process and apparatus, the performance of the ammonia injection grilles must ensure that the deviation of concentration distribution of the ammonia is lower than 5%. In contrast, there is no stringent requirement for the deviation of concentration distribution of the ammonia in the present invention, as long as the deviation of concentration distribution of the ammonia is not more than 30%; for example, the deviation of concentration distribution of the ammonia may be 5%-30%, preferably 12%-18%.

In the method according to the present invention, the molar ratio of ammonia to nitrogen oxides calculated as nitrogen atoms in the flue gas may be 0.9-1.15:1.

In the method according to the present invention, the flow velocity of the flue gas may be 2-15 m/s, preferably 4-10 m/s; the residence time for reaction may be 0.5-20 s.

In the method according to the present invention, preferably, the granular denitrification catalyst has the following properties: grain size: 3-6 mm, stacking density: 0.2-0.8 g/cm$^3$, and specific surface area: 80-120 m$^2$/g. The denitrification catalyst may be composed of common constituents in the art. Specifically, based on the weight of the catalyst, the contents of the constituents, in terms of oxides, are: 0.01-1 wt % V, 88-99 wt % Ti, 0.1-10 wt % W, and 0.01-1 wt % Mo. The preparation process of the denitrification catalyst may be as follows: dry mixing the materials-kneading-filtering-pugging-extrusion and pelletizing-drying in shade-drying-roasting-finished product, wherein the conditions involved in the preparation steps of the catalyst are well known to those skilled in the art, and the extrusion and pelleting may be executed with different models of kneading extrusion pelletizers according to the size of the catalyst granules.

In an embodiment of the present invention, the method of flue gas denitrification according to the present invention comprises: feeding the flue gas into a bottom of the denitrification reactor, injecting a gas mixture containing ammonia and air into the flue gas through ammonia injection grilles, and passing the gas flow through a plurality of catalyst beds arranged in a horizontally staggered manner from bottom to top to undergo a denitrification reaction to remove $NO_x$, at the same time the dust in the flue gas is filtered off by the catalyst beds, and the denitrificated and dedusted flue gas is discharged from the top of the reactor for subsequent desulfurization treatment; wherein the catalyst bed consists of a net conveyor belt and a granular denitrification catalyst stacked on the net conveyor belt; the two net conveyor belts in every two adjacent catalyst beds, i.e. an upper net conveyor belt and a lower one, travel in directions opposite to each other, the granular denitrification catalyst on the upper net conveyor belt moves with the upper conveyor belt to a tail end of the upper conveyor belt, and falls freely by gravity to a head end in the travel direction of the lower conveyor belt; at the tail end of the last conveyor belt, the granular denitrification catalyst falls into a catalyst recycling device and is recycled.

The granular denitrification catalyst is loaded through a catalyst charging pipe to a first net conveyor belt at the top of the denitrification reactor, and the catalyst drops on the net conveyor belts and is stacked to form a catalyst bed.

The catalyst recycling device usually is a conventional device, such as catalyst storage tank or catalyst hopper, etc. The recycled catalyst granules are sieved to remove dust and crushed catalyst granules, and then may be reused.

Figure 1:
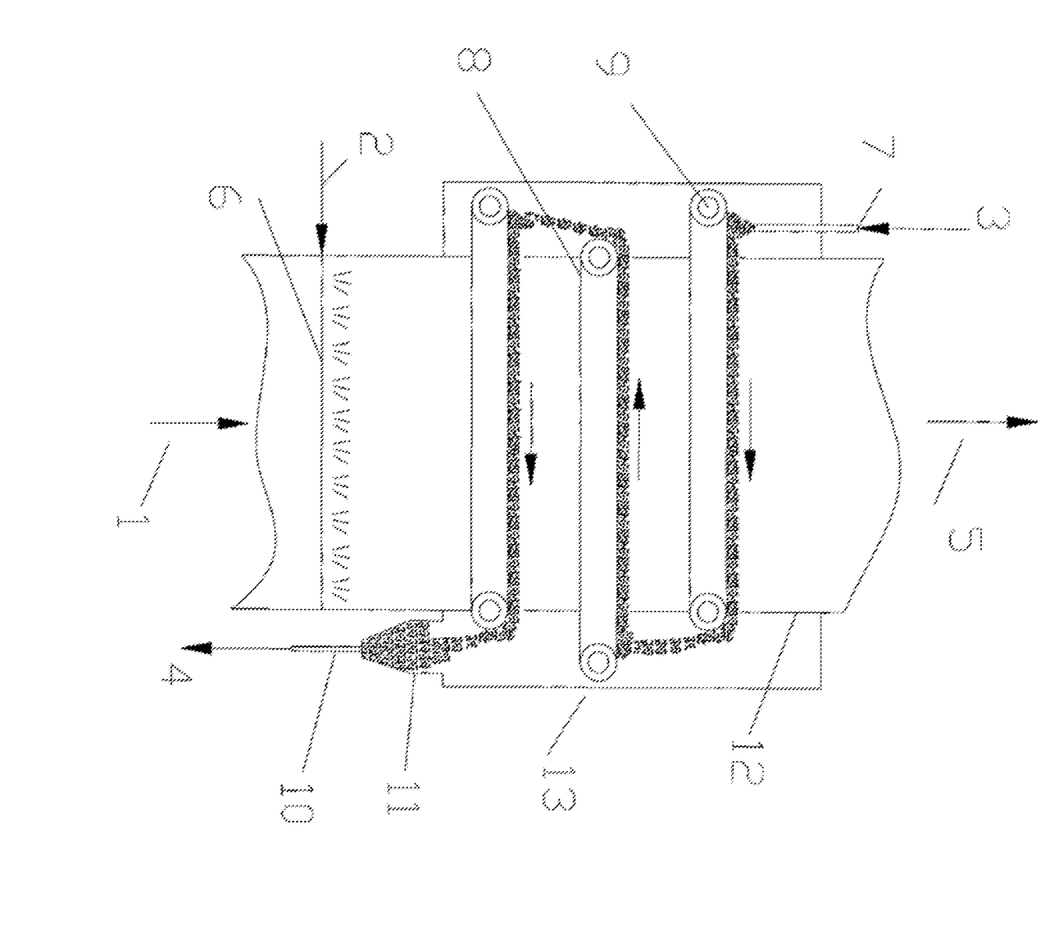
FIG. 1 is a schematic structural diagram of the denitrification reactor employed in the method of flue gas denitrification according to the present invention.

As shown in FIG. 1, the denitrification reactor described in the present invention comprises a reactor shell 13 and a plurality of catalyst support components arranged in a horizontally staggered manner from top to bottom in the reactor shell 13, and a plurality of catalyst support components are configured as follows: every two adjacent catalyst support components, i.e. an upper catalyst support component and a lower one, travel in directions opposite to each other, the granular denitrification catalyst on the upper catalyst support component moves to the tail end of the upper catalyst support component as the upper catalyst support component travels, and falls freely by gravity to the head end of the lower catalyst support component.

In a preferred embodiment, the catalyst support components are net conveyor belts. Further preferably, a plurality of catalyst beds are arranged in parallel to each other from top to bottom, i.e., a plurality of net conveyor belts that serve as catalyst support components are arranged in parallel to each other.

The net conveyor belts may be conventional metal net conveyor belts in the art, and preferably are stainless steel net conveyor belts. The mesh size of the net conveyor belts must be smaller than the granule size of the granular denitrification catalyst, to ensure that the catalyst granules will not fall through the nets. Usually, the mesh size of the net conveyor belts may be 0.1-3 mm, preferably is 1.5-2.5 mm.

In the present invention, as shown in FIG. 1, the denitrification reactor may further comprise an inner barrel 12, which penetrates the top end and the bottom end of the reactor shell 13, and the net conveyor belts penetrate the inner barrel 12 transversely. The net conveyor belts usually are motor-driven ones, and the conveyor belts are driven by conveyor belt driving wheels to rotate. To avoid damage to the driving wheels 9 of the net conveyor belts at a high temperature, preferably the driving wheels 9 of the net conveyor belts are disposed in a cavity between the inner barrel 12 and the reactor shell 13. Furthermore, a flue gas inlet is arranged at the bottom end of the inner barrel 12, and a flue gas outlet is arranged at the top end of the inner barrel 12, and an ammonia injection component 6 is arranged at the flue gas inlet.

In the denitrification reactor according to the present invention, a catalyst charging pipe 7 configured to charge the granular denitrification catalyst is provided corresponding to the head end (starting end) of the topmost catalyst support component, while a catalyst collection hopper configured to recycle catalyst granules is provided corresponding to the tail part (end) of the bottommost catalyst support component.

Hereunder the denitrification and dust removal method of the flue gas provided in the present invention will be detailed in examples, but the present invention is not limited to those examples.

In the examples and comparative examples, v % represents volume fraction, and wt % represents mass fraction.

The specific surface area and pore volume of the catalyst are measured with an ASAP 2420 large-size multi-station automatic specific surface area and pore analyzer.

The deviation of concentration distribution of ammonia in the test cases is a designed indicator, and can be ascertained through experimentation and calculation. CFD fluid mechanics calculation software is used to simulate the structure of the ammonia injection grilles to determine the deviation of concentration distribution of ammonia by calculating the average value and distribution range of ammonia concentration on the cross section.

The quantity of escaping ammonia and the dust content are measured with a CEMS online flue gas analyzer.

A schematic structural diagram of the denitrification reactor used in examples 1-5 is shown in FIG. 1. The denitrification reactor comprises a reactor shell 13, a reactor inner barrel 12, ammonia injection grilles 6, a catalyst charging pipe 7, net conveyor belts 8, conveyor belt driving wheels 9, a catalyst discharging pipe 10, and a catalyst hopper 11; wherein the space between the reactor shell 13 and the reactor inner barrel 12 is an outer sealed cavity of the reactor; the ammonia injection grilles 6 are disposed at a bottom inlet of the reactor inner barrel 12; the conveyor belt driving wheels 9 are disposed in the outer sealed cavity of the reactor; the conveyor belts 8 adhere to the conveyor belt driving wheels 9 penetrate the reactor inner barrel 12 transversely; the catalyst charging pipe 7 is disposed at the top of the outer sealed cavity of the reactor, a bottom outlet of the catalyst charging pipe 7 is facing one end of the conveyor belt; the catalyst hopper 11 is disposed at the bottom of the outer sealed cavity of the reactor, and the catalyst discharging pipe 10 is disposed at the bottom of the catalyst hopper 11.

The operating process of flue gas denitrification is as follows: the granular denitrification catalyst 3 is charged through the catalyst charging pipe 7 to a first net conveyor belt 8 and is stacked to form a bed; then the bed on the conveyor belt 8 moves driven by the conveyor belt driving wheel 9, passes through the reactor inner barrel 12, enters the outer seal cavity of the reactor, and falls by gravity to the next conveyor belt and forms a bed there, and then moves in the opposite direction driven by the conveyor belt driving wheel 9; in that way, continuous conveyor belt beds are formed; the flue gas 1 is charged from the bottom of the denitrification bed reactor, the gas mixture 2 containing ammonia is injected through the ammonia injection grilles 6 into the flue gas 1, the resultant mixture of the flue gas 1 and the gas mixture 2 passes through the beds on the conveyor belts from bottom to top, and undergoes a denitrification reaction to remove $NO_x$; at the same time, the dust is filtered off by the beds; the granular denitrification catalyst falls into the catalyst hopper 11 at the tail end of the last conveyor belt, the granular denitrification catalyst after denitrification is discharged from the reactor through the catalyst discharging pipe 10 and is recycled, and after removing $NO_x$ and dust, the purified gas 5 is discharged from the top of the reactor.

Example 1

FCC regenerated flue gas is fed at a volume flow of 150,000 $Nm^3$/h, a temperature of 650° C., and a pressure of 10 kPa, wherein the $NO_x$ concentration is 600 $mg/Nm^3$, the $SO_2$ concentration is 1,000 $mg/Nm^3$, the $SO_3$ concentration is 20 $mg/Nm^3$, and the dust content is 200 $mg/Nm^3$. The $NO_x$ emission standard value is 200 $mg/Nm^3$.

The active constituents of the granular denitrification catalyst include oxides of V, oxides of Ti, oxides of W, and oxides of Mo. The catalyst granules are spherical granules, and in terms of oxides, the mass ratios are as follows: V: 0.01 wt %, Ti: 99 wt %, W: 0.1 wt %, and Mo: 0.02 wt %.The catalyst has a granule size of 5 mm, a stacking density of 0.68 g/cm$^3$, and a specific surface area of 40 m$^2$/g.

The FCC regenerated flue gas is fed into a boiler first to exchange heat, and the temperature of the flue gas is decreased from 650° C. to SCR denitrification reaction temperature (400° C.); the gas mixture containing ammonia is supplied by the raw material supply area at a volume flow of 1,120 Nm$^3$/h, wherein the ammonia concentration is 4 v %; the dimensions of the inner sealed cavity in the reactor is 8 m (Length)×6 m (Width)×8 m (Height); the reaction time is 0.5 s, 3 conveyor belts are provided, the stacking thickness of the catalyst on each conveyor belt is 300 mm, the dimensions of the conveyor belts are 9 m (Length)×5.8 m (Width), and are stainless steel net conveyor belts with nets with the diameter of 3 mm, the driving wheels are 300 mm in diameter, the clearance between every two adjacent conveyor belts is 1,300 mm, to reserve enough maintenance space. After the denitrification reaction, the NO$_x$ content in the purified flue gas is 100 mg/Nm$^3$, and the dust content is lower than 10 mg/Nm$^3$, meeting the friendly-environment requirements in key controlled regions; then SO$_2$ and dust are removed from the flue gas through desulfurization and dust removal, and finally the purified flue gas can be emitted through the flue gas stack.

Example 2

The volume flow, temperature and pressure of the FCC regenerated flue gas are the same as those in the example 1, the NO$_x$ concentration is 2,000 mg/Nm$^3$, the SO$_2$ concentration is 2,000 mg/Nm$^3$, the SO$_3$ concentration is 200 mg/Nm$^3$, and the dust content is 400 mg/Nm$^3$. The NO$_x$ emission standard value is 100 mg/Nm$^3$.

The composition of the catalyst is the same as that in the example 1.

The FCC regenerated flue gas is fed into a boiler first to exchange heat, and the temperature of the flue gas is decreased from 650° C. to SCR denitrification reaction temperature (300° C.); the gas mixture containing ammonia is supplied by the raw material supply area at a volume flow of 1,000 Nm$^3$/h, wherein the ammonia concentration is 3 v %; the dimensions of the inner sealed cavity in the reactor are 8 m (Length)×6 m (Width)×15 m (Height); the reaction time is 2 s, 10 conveyor belts are provided, the stacking thickness of the catalyst on each conveyor belt is 500 mm, the dimensions of the conveyor belts are 9 m (Length)×5.8 m (Width), and are stainless steel net conveyor belts with nets with a diameter of 3 mm, the driving wheels are 300 mm in diameter, the clearance between every two adjacent conveyor belts is 1,500 mm, to reserve an enough maintenance space. After the denitrification reaction, the NO$_x$ content in the purified flue gas is 100 mg/Nm$^3$, and the dust content is lower than 5 mg/Nm$^3$, meeting the friendly-environment requirements in key controlled regions; then SO$_2$ and dust are removed from the flue gas through desulfurization and dusting, and finally the purified flue gas can be emitted through the flue gas stack.

Example 3

The volume flow, temperature and pressure of the FCC regenerated flue gas are the same as those in the example 1, the NO$_x$ concentration is 300 mg/Nm$^3$, the SO$_2$ concentration is 600 mg/Nm$^3$, the SO$_3$ concentration is 10 mg/Nm$^3$, and the dust content is 100 mg/Nm$^3$. The NO$_x$ emission standard value is 200 mg/Nm$^3$.

The composition of the catalyst is the same as that in the example 1, and the catalyst granules are 3 mm in diameter.

The FCC regenerated flue gas is fed into a boiler first to exchange heat, and the temperature of the flue gas is decreased from 650° C. to SCR denitrification reaction temperature (300° C.); the gas mixture containing ammonia is supplied by the raw material supply area at a volume flow of 2,000 Nm$^3$/h, wherein the ammonia concentration is 2.8 v %; the dimensions of the inner sealed cavity in the reactor are 8 m (Length)×6 m (Width)×6 m (Height); the reaction time is 0.5 s, 3 conveyor belts are provided, the stacking thickness of the catalyst on each conveyor belt is 50 mm, the dimensions of the conveyor belts are 9 m (Length)×5.8 m (Width), and are stainless steel net conveyor belts with nets with a diameter of 2.5 mm, the driving wheels are 500 mm in diameter, the clearance between every two adjacent conveyor belts is 2,000 mm, to reserve enough maintenance space. After the denitrification reaction, the NO$_x$ content in the purified flue gas is 100 mg/Nm$^3$, and the dust content is lower than 5 mg/Nm$^3$, meeting the friendly-environmental requirements in key controlled regions; then SO$_2$ and dust are removed from the flue gas through desulfurization and dust removal, and finally the purified flue gas can be emitted through the flue gas stack.

Example 4

The volume flow, temperature and pressure of the FCC regenerated flue gas are the same as those in the example 1, the NO$_x$ concentration is 800 mg/Nm$^3$, the SO$_2$ concentration is 3,600 mg/Nm$^3$, the SO$_3$ concentration is 1,000 mg/Nm$^3$, and the dust content is 200 mg/Nm$^3$. The NO$_x$ emission standard value is 100 mg/Nm$^3$.

The composition of the catalyst is the same as that in the example 1, and the catalyst granules are 6 mm in diameter.

The FCC regenerated flue gas is fed into a boiler first to exchange heat, and the temperature of the flue gas is decreased from 650° C. to SCR denitrification reaction temperature (300° C.); the gas mixture containing ammonia is supplied by the raw material supply area at a volume flow of 2,000 Nm$^3$/h, wherein the ammonia concentration is 2.8 v %; the dimensions of the inner sealed cavity in the reactor are 8 m (Length)×6 m (Width)×6 m (Height); the reaction time is 0.5 s, 3 conveyor belts are provided, the stacking thickness of the catalyst on each conveyor belt is 500 mm, the dimensions of the conveyor belts are 9 m (Length)×5.8 m (Width), and are stainless steel net conveyor belts with nets with a diameter of 0.2 mm, the driving wheels are 300 mm in diameter, the clearance between every two adjacent conveyor belts is 2,000 mm, to reserve enough maintenance space. After the denitrification reaction, the NO$_x$ content in the purified flue gas is 100 mg/Nm$^3$, and the dust content is lower than 5 mg/Nm$^3$, meeting the friendly-environment requirements in key controlled regions; then SO$_2$ and dust are removed from the flue gas through desulfurization and dust removal, and finally the purified flue gas can be emitted through the flue gas stack.

Example 5

FCC regenerated flue gas is fed at a volume flow of 8,500 Nm$^3$/h, a temperature of 650° C., and a pressure of 10 kPa, wherein the NO$_x$ concentration is 600 mg/Nm$^3$, the SO$_2$ concentration is 1,000 mg/Nm$^3$, the SO$_3$ concentration is 20 mg/Nm$^3$, and the dust content is 200 mg/Nm$^3$. The NO$_x$ emission standard value is 200 mg/Nm$^3$.

The composition of the catalyst is the same as that in the example 1, and the catalyst granules are 5 mm in diameter.

The FCC regenerated flue gas is fed into a boiler first to exchange heat, and the temperature of the flue gas is decreased from 650° C. to SCR denitrification reaction temperature (400° C.); the gas mixture containing ammonia is supplied by the raw material supply area at a volume flow of 70 Nm$^3$/h, wherein the ammonia concentration is 4 v %; the dimensions of the inner sealed cavity in the reactor are 1.2 m (Length)×1 m (Width)×1.2 m (Height); the reaction time is 0.5 s, 3 conveyor belts are provided, the stacking thickness of the catalyst on each conveyor belt is 40 mm, the dimensions of the conveyor belts are 1.5 m (Length)×0.8 m (Width), and are stainless steel net conveyor belts with nets with a diameter of 3 mm, the driving wheels are 50 mm in diameter, and the clearance between every two adjacent conveyor belts is 200 mm. After the denitrification reaction, the NO$_x$ content in the purified flue gas is 100 mg/Nm$^3$, and the dust content is lower than 10 mg/Nm$^3$, meeting the friendly-environmental requirements in key controlled regions; then SO$_2$ and dust are removed from the flue gas through desulfurization and dust removal, and finally the purified flue gas can be emitted through the flue gas stack.

Comparative Example 1

It is essentially the same as the example 1, except that the reactor is replaced with a conventional fixed bed-type reactor, and that the catalyst is a honeycombed catalyst. The catalyst has same constituents as those in example 1, and is loaded in a modular form, and the height of unit catalyst module is 1 m. The dimensions of the reactor are 4.4 m×4.6 m, and three layers of catalyst are loaded. The FCC regenerated flue gas is charged into a boiler first to exchange heat, and the temperature is decreased from 650° C. to SCR denitrification reaction temperature (350° C.). The gas mixture containing ammonia is supplied by the raw material supply area at a volume flow of 1,000 Nm$^3$/h, wherein the ammonia concentration is 3 v %. The gas mixture containing ammonia is charged through an upstream flue certain distance away from the inlet of the reactor. After mixed and diffused by the ammonia injection grilles the deviation of ammonia concentration in the flue gas at the inlet of the reactor is lower than 5%. Then the flue gas enters the SCR reactor and reacts therein. After the denitrification reaction, the NO$_x$ content in the purified flue gas is 100 mg/Nm$^3$. The denitrificated flue gas enters the downstream units for heat exchange, desulfurization and dust removal, to meet the friendly-environment requirements in key controlled regions.

Comparative Example 2

It is essentially the same as the example 2, except that the reactor is replaced with a conventional fixed bed-type reactor.

Comparative Example 3

It is essentially the same as the example 3, except that the reactor is replaced with a conventional fixed bed-type reactor.

Comparative Example 4

It is essentially the same as the example 4, except that the reactor is replaced with a conventional fixed bed-type reactor.

Comparative Example 5

It is essentially the same as the example 5, except that the reactor is replaced with a conventional fixed bed-type reactor, and that the catalyst is a honeycombed catalyst. The catalyst has same constituents as those in the example 5, and is loaded in a modular form, and the height of unit catalyst module is 150 mm. The dimensions of the reactor are 700 mm×800 mm, and three layers of catalyst are loaded. The FCC regenerated flue gas is charged into a boiler first to exchange heat, and the temperature is decreased from 650° C. to SCR denitrification reaction temperature (350° C.). The gas mixture containing ammonia is supplied by the raw material supply area at a volume flow of 60 Nm$^3$/h, wherein the ammonia concentration is 3 v %. The gas mixture containing ammonia is charged through an upstream flue certain distance away from the inlet of the reactor. After mixed and diffused by the ammonia injection grilles, the deviation of ammonia concentration in the flue gas at the inlet of the reactor is lower than 5%. Then the flue gas enters the SCR reactor and reacts therein. After the denitrification reaction, the NO$_x$ content in the purified flue gas is 100 mg/Nm$^3$. The denitrificated flue gas enters the downstream units for heat exchange, desulfurization and dust removal, to meet the friendly-environment requirements in key controlled regions.

Comparative Example 6

The reactor described in the comparative example 1 is still used; since the NO$_x$ concentration increases too much, the ammonia escape is kept to be <3 mg/Nm$^3$. The NO$_x$ concentration after denitrification is 1,000-1,300 mg/Nm$^3$ and doesn't meet the standard; in addition, the dust still has to be treated in a desulfurization and dust removal system.

Test Cases

The operation periods and catalyst consumption in examples 1-4 and comparative examples 1-4 are shown in Table 1; the operation periods and catalyst consumption in example 5 and comparative example 5 are shown in Table 2; the ammonia distribution requirements of the ammonia injection grilles are shown in Table 3.

TABLE 1

|  | Operation period | Catalyst consumption (8-year operation) |  | Operation period | Catalyst consumption (8-year operation) |
| --- | --- | --- | --- | --- | --- |
| Example 1 | ≥8 years | 60 m$^3$ | Comparative example 1 | 4 years | 85 m$^3$ |
| Example 2 | ≥8 years | 360 m$^3$ | Comparative example 2 | 3 years | 645 m$^3$ |

TABLE 1-continued

| | Operation period | Catalyst consumption (8-year operation) | | Operation period | Catalyst consumption (8-year operation) |
|---|---|---|---|---|---|
| Example 3 | ≥12 years | 15 m³ | Comparative example 3 | 6 years | 40 m³ |
| Example 4 | ≥8 years | 60 m³ | Comparative example 4 | 3 years | 130 m³ |

TABLE 2

| | Operation period | Catalyst consumption (1-year operation) |
|---|---|---|
| Example 5 | ≥1 year | 0.12 m³ |
| Comparative example 5 | 0.5 year | 0.25 m³ |

TABLE 3

| | Deviation of concentration distribution of ammonia | Quantity of escaping ammonia (mg/Nm³) | Dust content in purified flue gas (mg/Nm³) |
|---|---|---|---|
| Example 1 | <10% | 0 | <10 |
| Example 2 | <30% | 0 | <5 |
| Example 3 | <7% | 0 | <5 |
| Example 4 | <15% | 0 | <5 |
| Example 5 | <15% | 0 | <5 |
| Comparative example 1 | <5% | 1.0 | 200 |
| Comparative example 2 | <5% | 1.0 | 200 |
| Comparative example 3 | <5% | 1.2 | 400 |
| Comparative example 4 | <5% | 0.9 | 100 |
| Comparative example 5 | <5% | 1.0 | 200 |

It is seen from the data in the Tables 1-3: with the method of flue gas denitrification according to the present invention, the utilization efficiency of the catalyst can be improved, and the consumption of the catalyst can be reduced greatly; moreover, in the method according to the present invention, ammonia escape will not occur, and the requirement for uniformity of initial ammonia distribution on the beds is not stringent; in addition, the method according to the present invention can attain a good dedusting effect.

While the present invention is described above in detail in some preferred examples, the present invention is not limited to those examples. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A method of flue gas denitrification, comprising: in the presence of ammonia, passing a flue gas through a plurality of catalyst beds disposed from bottom to top in a denitrification reactor to undergo a denitrification reaction, wherein each catalyst bed comprises a catalyst support component and a granular denitrification catalyst stacked on the catalyst support component; an upper catalyst support component and a lower catalyst support component in every two adjacent catalyst beds travel in directions opposite to each other, and the granular denitrification catalyst on the upper catalyst support component moves with the upper catalyst support component to a tail end of the upper catalyst support component, and falls by gravity to a head end of the lower catalyst support component.

2. A method of flue gas denitrification, comprising: introducing a flue gas into a denitrification reactor to a bottom part of a denitrification reactor;
injecting a gas mixture containing ammonia into the flue gas through one or more ammonia injection grilles;
passing a gas flow through a plurality of catalyst beds arranged in a horizontally staggered manner from bottom to top to undergo a denitrification reaction to remove $NO_x$,
filtering the flue gas to remove dust from the catalyst beds; and
discharging a denitrificated and dedusted flue gas from a top portion of the denitrification reactor,
wherein each catalyst bed comprises a net conveyor belt and a granular denitrification catalyst stacked on the net conveyor belt; the two conveyor belts in every two adjacent catalyst beds, i.e. an upper net conveyor belt and a lower net conveyor belt, travel in directions opposite to each other, the granular denitrification catalyst on the upper conveyor belt moves with the upper conveyor belt to a tail end of the upper conveyor belt, and falls by gravity to a head end in the travel direction of the lower conveyor belt; and the granular denitrification catalyst fells from the tail end of the bottom catalyst bed is collected and recycled.

3. The method according to claim 1, wherein the catalyst support component is a net conveyor belt.

4. The method according to claim 3, wherein the net conveyor belt has a mesh size of 0.1-3 mm.

5. The method according to claim 1, wherein a distance of number of the catalyst beds is 3-10.

6. The method according to claim 1, wherein a distance in a vertical distance between every two adjacent catalyst beds is 1,200-2,000 mm.

7. The method according to claim 1, wherein the flue gas entering the denitrification reactor has a temperature of 300-420° C.

8. The method according to claim 1, wherein the ammonia is introduced in the form of a gas mixture containing ammonia and air, and a volumetric concentration of the ammonia in the gas mixture is 0.5-10%.

9. The method according to claim 8, wherein the gas mixture is injected below the bottom catalyst bed.

10. The method according to claim 1, wherein a molar ratio of ammonia to nitrogen oxides in terms of nitrogen atoms in the flue gas is 0.9-1.15:1.

11. The method according to claim 1, wherein a velocity of the flue gas is 2-15 m/s, and a residence time for reaction is 0.5-20 s.

12. The method according to claim 1, wherein the granular denitrification catalyst has a granule size of 3-6 mm, a stacking density of 0.2-0.8 g/cm$^3$, and a specific surface area of 80-120 m$^2$/g.

13. The method according to claim 1, wherein the granular denitrification catalyst forms a layer on the catalyst support component having a thickness of 50-500 mm.

14. The method according to claim 3, wherein a speed of the net conveyor belt is 0.1-10 mm/s.

15. The method according to claim 1, wherein the ammonia is injected into the denitrification reactor through an ammonia injection grille.

16. The method according to claim 15, wherein a deviation of concentration distribution of the ammonia in the gas mixture injected through the ammonia injection grille is 5%-30%.

17. The method according to claim 2, wherein the net conveyor belt has a mesh size of 0.1-3 mm.

18. The method according to claim 2, wherein a speed of the net conveyor belt is 0.1-10 mm/s.

19. The method according to claim 2, wherein a deviation of concentration distribution of the ammonia in the gas mixture injected through the ammonia injection grille is is 5%-30%.

\* \* \* \* \*